(12) United States Patent
Aloni et al.

(10) Patent No.: US 6,366,687 B1
(45) Date of Patent: *Apr. 2, 2002

(54) DATA CONVERTER APPARATUS AND METHOD PARTICULARLY USEFUL FOR A DATABASE-TO-OBJECT INSPECTION SYSTEM

(75) Inventors: Meir Aloni, Herzelia; Nissim Elmaliach, Raanana; Mula Friedman, Aharon; Yonatan Lehman, Gamliel, all of (IL)

(73) Assignee: Applied Materials, Inc., Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,625
(22) PCT Filed: Jul. 4, 1997
(86) PCT No.: PCT/IL97/00226
  § 371 Date: Aug. 10, 1998
  § 102(e) Date: Aug. 10, 1998
(87) PCT Pub. No.: WO98/01827
  PCT Pub. Date: Jan. 15, 1998

(30) Foreign Application Priority Data
  Jul. 5, 1996 (IL) ................................................ 118804

(51) Int. Cl.[7] ............................. G06K 9/03; G06K 9/36
(52) U.S. Cl. ........................ 382/144; 382/149; 382/304
(58) Field of Search ................................. 382/144, 145, 382/149, 180, 204, 217, 218, 240, 241, 243, 304, 305; 348/87, 126; 356/237.4, 237.5, 383, 384, 390; 250/559.2, 559.39, 559.46; 364/468.17, 468.28; 438/16; 702/82, 159; 707/1, 101, 104

(56) References Cited

U.S. PATENT DOCUMENTS

| | | | | |
|---|---|---|---|---|
| 4,984,282 A | | 1/1991 | Manns et al. | 382/8 |
| 5,127,064 A | * | 6/1992 | Flinois et al. | 382/56 |
| 5,253,182 A | * | 10/1993 | Suzuki | 364/489 |
| 5,404,410 A | * | 4/1995 | Tojo et al. | 382/50 |

* cited by examiner

Primary Examiner—Leo Boudreau
Assistant Examiner—Brian P. Werner
(74) Attorney, Agent, or Firm—Sughrue Mion Zinn MacPeak & Seas LLP.

(57) ABSTRACT

Data converter apparatus for converting in real time data stored in an input compact format into an output expanded real time format. The data including a plurality of groups and repetition of the groups. The groups including, each, many basic geometric figures (BGF). The data converter includes a processor adapted to selecting data relating to a predetermined division, dividing and processing the data into consecutive bins according to scan order, which bins have structural correspondence to the input format. The data converter is further capable of sub-dividing the division into sub-divisions which have structural correspondence to the output format. The data processor is further capable of processing and allocating the BGFs in the bins to sub-divisions to thereby produce a division data stream in the output expanded real time format.

30 Claims, 15 Drawing Sheets

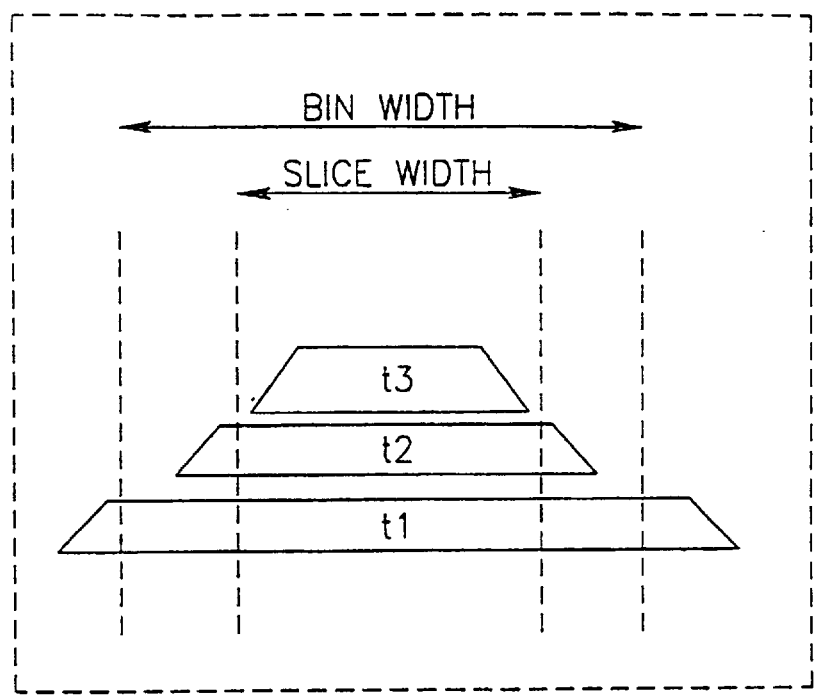
FIG.6C
SOFTWARE CLIP t1
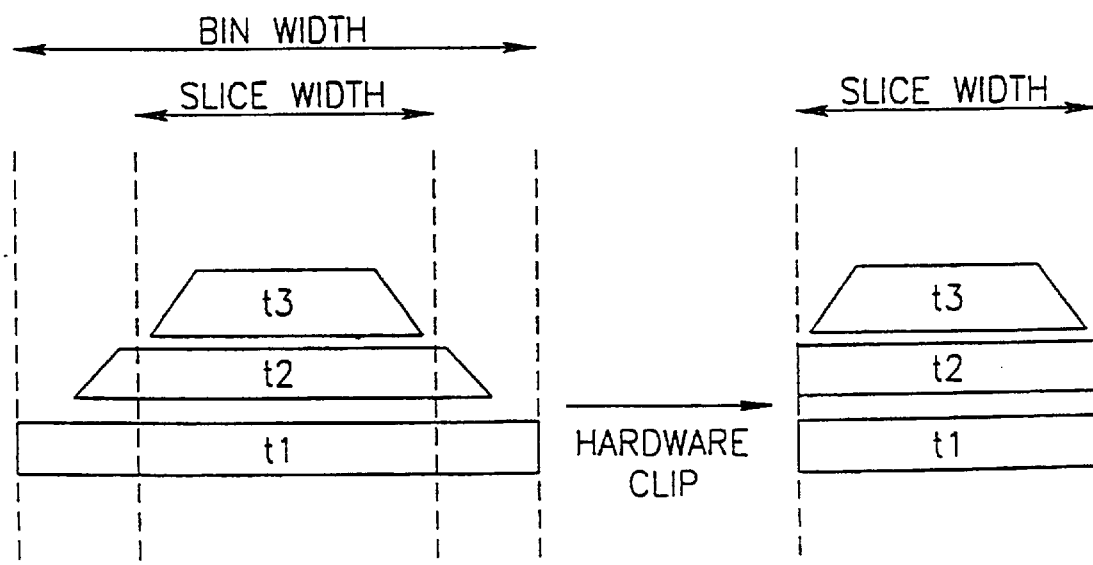
FIG.6D
HARDWARE CLIP
FIG.6E

DATA CONVERTER APPARATUS AND METHOD PARTICULARLY USEFUL FOR A DATABASE-TO-OBJECT INSPECTION SYSTEM

FIELD AND BACKGROUND OF THE INVENTION

The present invention relates to a data converter apparatus and method and also to a database-to-object inspection system including such a data converter. The invention is particularly useful for, but is not limited to, optically inspecting masks utilized in constructing integrated circuit reticles and wafers and/or the integrated circuit reticles and wafers constructed with such masks. The invention is therefore described below particularly with respect to this application.

Database-to-object inspection systems as used for inspecting masks, or the chips or wafers constructed with such masks, include an optical inspection system for inspecting the object and for outputting a series of pixels corresponding to the inspected surface, and a database containing design data corresponding to a reference, or defectless, object. The object data output from the optical inspection system is compared with the design data in the database, and mismatches or discrepancies are outputted in the form of a list of defects.

Mask inspection involves, normally, successively scanning e.g. vertical slices of the inspected mask surface, where each slice typically extends over a narrow strip (say 1024 to 2048 pixels). The scanning of a slice results in a stream of pixels that is compared to a similar stream of pixels that originates from a corresponding slice of a reference defectless object. As explained before, any discrepancies are recorded in a list of defects.

By following this approach, the design data from the database must be fed to the comparator at approximately the same rate as the object data from the inspection system; otherwise, the inspection system will have to slow down, causing a reduction in inspection rate and a lowering of the machine throughput.

The design data is normally stored in a number of design formats, such as GDS II, JEOL, Hitachi, MEBES. However, these data after having been combined into a single file and converted to output format, are very large, approaching disc volume, and their density (features per area) is very high. Handling data files of such sizes and densities involves serious problems in disc space, computer memory, communication transfer rate, computation time, etc., needed to convert from the design format to the machine's internal format. These problems are made even more severe by the continuous increase and complexity of the data in the new technologies.

For these reasons, the design data is converted off-line, and before the inspection starts, into a compact format comprised of a plurality of repeating, predefined units, including basic geometric figures (hereinafter called BGFs), cells and/or arrays thereof, and their locations in the pattern. A common BGF is a trapezoid, but other BGFs may be used, such as polygons, lines, etc. Thus, the compact format, sometimes called a Hierarchical format or HIF, needs to define each different BGF only once, and to specify each location of each so-defined BGF, thereby enabling the pattern to be described with considerably less data.

Accordingly, in order to exploit the data that originate from the defectless design data as a basis for comparison, a preliminary format conversion step should be effected. More specifically, the trapezoid data in a slice in the reference defectless design data (represented in HIF format) must be converted into a corresponding stream of pixels that is organized in the same fashion as the stream of pixels in a scanned slice of the inspected mask, to thereby facilitate the specified comparison.

Generally speaking, this preliminary conversion step involves dealing with a very large volume of data (including a huge amount of BGF data) that should be converted. This necessitates a relatively prolonged computation time in order to convert the BGF representation from the input format (HIF) into the stream of pixels as explained above. The time required for these computations may adversely affect the performance of the converter to such an extent which it may no longer be able to meet real-time requirements that are dictated by the scanning rate of the inspected object.

In light of the above identified problems, there is a need in the art for a data converter apparatus and method for converting design data stored in a compact format into expanded real-time data so that the design data is present to the comparator in the inspection system essentially at the same rate as the inspection data.

SUMMARY OF THE INVENTION

According to one aspect of the present invention, there is provided a data converter apparatus for converting in essentially real time data stored in an input compact format into an output expanded real time format, the data including a plurality of groups and instances thereof, each group including a plurality of basic geometric figures (BGF); the data converter comprising:

first processor adapted to receiving the data stored in the compact format, selecting data relating to a pre-defined division, which division includes a plurality of groups, dividing each group into at least one bin, determining the number of instances of each different bin in a respective division, converting the format of the data of the plurality of BGFs in each different bin into an output related format, outputting a list of different bins and the location of the bins in the respective division;

a partial expander adapted to receiving, expanding and sorting said list of bins in each respective division, according to scan order; and a final expander adapted to sub-dividing, according to scan order, each division into a plurality of sub-divisions, processing and allocating each BGF in a respective bin into a sub-division according to the location of the respective BGF in the bin and the location thereof in the sub division, generating a sub-division data stream representative of the plurality of BGFs in a respective sub division, and combining said sub-division data streams into one data stream in said output expanded real time format, which data stream is representative of the plurality of BGFs in the respective division.

The invention further provides for data converter apparatus for converting in essentially real time data stored in an input compact format into an output expanded real time format, the data including a plurality of groups and repetitions thereof, each group including a plurality of basic geometric figures (BGF); the data converter comprising:

a processor adapted to selecting data relating to a predetermined division, dividing and processing said data into consecutive bins according to scan order, which bins have structural correspondence to the input format;

sub dividing the respective division into sub-divisions having structural correspondence to the output format;

processing and allocating the BGFs in the bins to subdivisions to thereby producing a division data stream in said output expended real time format.

Still further, the invention provides for a database-to-object inspection system, including:
- an optical inspection system optically inspecting a surface of an object and outputting a series of pixels corresponding to the surface thereof;
- a database containing design data of the object, which design data is stored in an input compact format;
- data converter apparatus of the kind specified, adapted to convert in essentially real time the data stored in the input compact format into an output expanded real time format;
- a comparator comparing in real time the series of pixels outputted by the optical inspection system with a series of pixels in said real time expanded format outputted by said converter apparatus.

The invention further provides for a method for converting in essentially real time data stored in an input compact format into an output expanded real time format, the data including a plurality of groups and instances thereof, each group including a plurality of basic geometric figures (BGF); the method comprising the following steps:
(a) receiving the data stored in the compact format,
(b) selecting data relating to a pre-defined division, which division includes a plurality of groups,
(c) dividing each group into at least one bin,
(d) determining the number of instances of each different bin in a respective division,
(e) converting the format of the data of the plurality of BGFs in each different bin into an output related format,
(f) outputting a list of different bins and the location of the bins in the respective division;
(g) partially expanding said list of bins in each respective division, according to scan order;
(h) sub-dividing, according to scan order, each division into a plurality of sub-divisions,
(i) processing and allocating each BGF in a respective bin into a sub-division according to the location of the respective BGF in the bin and the location thereof in the sub division,
(j) generating a sub-division data stream representative of the plurality of BGFs in a respective sub division; and
(k) combining said sub-division data streams into one data stream in said output expanded real time format, which data stream is representative of the plurality of BGFs in the respective division.

The invention still provides for a method for converting in essentially real time data stored in an input compact format into an output expanded real time format, the data including a plurality of groups and repetitions thereof, each group including a plurality of basic geometric figures (BGF); the method comprising the following steps:
(a) selecting data relating to a predetermined division,
(b) dividing and processing said data into consecutive bins according to scan order, which bins have structural correspondence to the input format;
(c) sub dividing the respective division into sub-divisions having structural correspondence to the output format;
(d) processing and allocating the BGFs in the bins to subdivisions to thereby producing a division data stream in said output expended real time format.

Still further, the invention provides for a method for optically inspecting a surface of an object, comprising:
- storing in a database design data of the object in a compact format;
- converting the database design data stored in said compact format into a stream of pixels in an expanded real time format, according to the specified method;
- optically inspecting said surface and producing a stream of pixels corresponding to the inspected surface; and
- comparing in real time the stream of pixels corresponding to the inspected surface with the stream of pixels in said real time expanded format.

As indicated above, the invention is particularly useful in a database-to-object inspection system. In such systems, the predefined divisions represent e.g. slices of the object (e.g., a mask representing a frame or layer of an IC chip or wafer, or the chip or wafer itself) having a plurality of patterns, and the subdivisions are e.g. equally divided windows of the respective object.

As will be described more particularly below, a data converter apparatus constructed in accordance with the foregoing features particularly when used in a database-to-object inspection system, provide a number of important advantages, including the following: (1) it maintains the original database hierarchy, and thereby keeps the data files very compact, of similar size (or smaller) than the original database of compact format; (2) it enables the compaction to be retained far within the data path, thereby reducing the limitations of memory and communication transfer rate; (3) it enables the use of hardware and software which are scaleable, permitting duplicate components to be added where necessary to handle more complex and/or dense data without substantially slowing down the overall inspection operation; and (4) it permits dynamic slowdown to be performed when a limitation (memory, transfer rate, etc.) is reached during the inspection process, by changing the width of the slice, while retaining the maximum scanning rate.

Further features and advantages of the invention will be apparent from the description below.

The invention is herein described, by way of example only, with reference to the accompanying drawings, wherein:

FIGS. 6A–6E illustrate a plurality of trapezoid sequences that are subjected to clipping in the X and Y coordinate;

DESCRIPTION OF A PREFERRED EMBODIMENT

The Optical Inspection System

Figure 1:
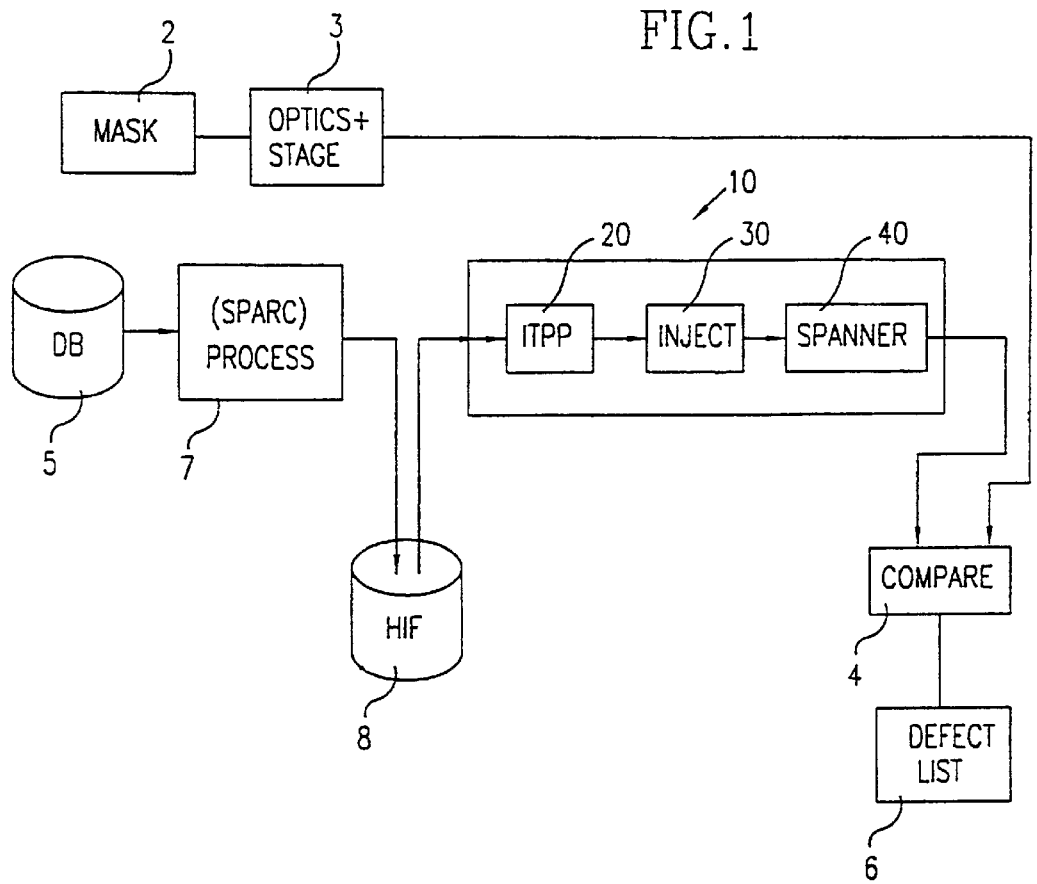
FIG. 1 illustrates an example of an optical inspection system in accordance with the present invention.

FIG. 1 illustrates an optical inspection system in which a mask 2 (or other object such as a reticle or wafer produced by an image of the reticle) is inspected by an optical system, schematically indicated at 3, which outputs image pixels corresponding to the inspected mask. These pixels are compared, in a comparator system 4, with pixels derived from a design database 5 representing a defectless or reference mask. Mismatches or discrepancies between the inspection-derived object pixels and the database-derived design pixels are outputted by the comparator system 4 in the form of a defect list 6.

The reference data in the database 5 may be stored in one of the standard formats, such as GDSII, JEOL, Hitachi, MEBES, and the like. Such data normally includes a BGF representation of the various patterns that constitute a frame as well as graphic transformations that should be applied to the BGFs. The compact data is converted in an off-line pre-processor 7, before the inspection starts, to a counterpart HIF (Hierarchical) compact data format file 8.

Transformations which cannot be done in real time, or processing steps which need to process all of the data as a unit in order to achieve a result (for example, reverse and sizing), are done in preprocessor 7. These operations are executed at the pattern level, so pattern arraying is still maintained, and, in general, compaction lost by an operation such as reverse can be recovered, and in some cases even improved. The resulting file called HIF 8 contains multiple instances of multiple patterns. Each pattern maintains its original address unit and hierarchical figure and cell tree. Some operations (such as reverse) change the address unit and hierarchical tree, but, in general, data compaction is maintained so that the HIF is not much larger than the original pattern files 5.

The system illustrated in FIG. 1 includes a data converter, generally designated 10, that is constructed in accordance with the present invention for converting the data in the compact format of HIF file 8 into a real-time expanded format that corresponds to the series of pixels which is compared to the series of pixels representative of the inspected object. The expanded format presents the data to the comparator system 4 approximately at the same rate, as the object data from the optical inspection system 3, in order to enable the two streams of data to be compared in real time.

As will also be described more fully below, the design data in the compact format derived from the database 5 is divided into predefined divisions, in this case slices of the reference mask. During the inspection process, the data converter 10 converts the data from the compact format of one slice (say, slice$_i$) to the expanded format at the same time it reads the data for the next slice (slice$_{i+1}$) from the HIF file, such that the output of the data converter is a stream of pixels at the same rate as that of the inspected object (mask) pixels.

The Design Data

Figure 2:
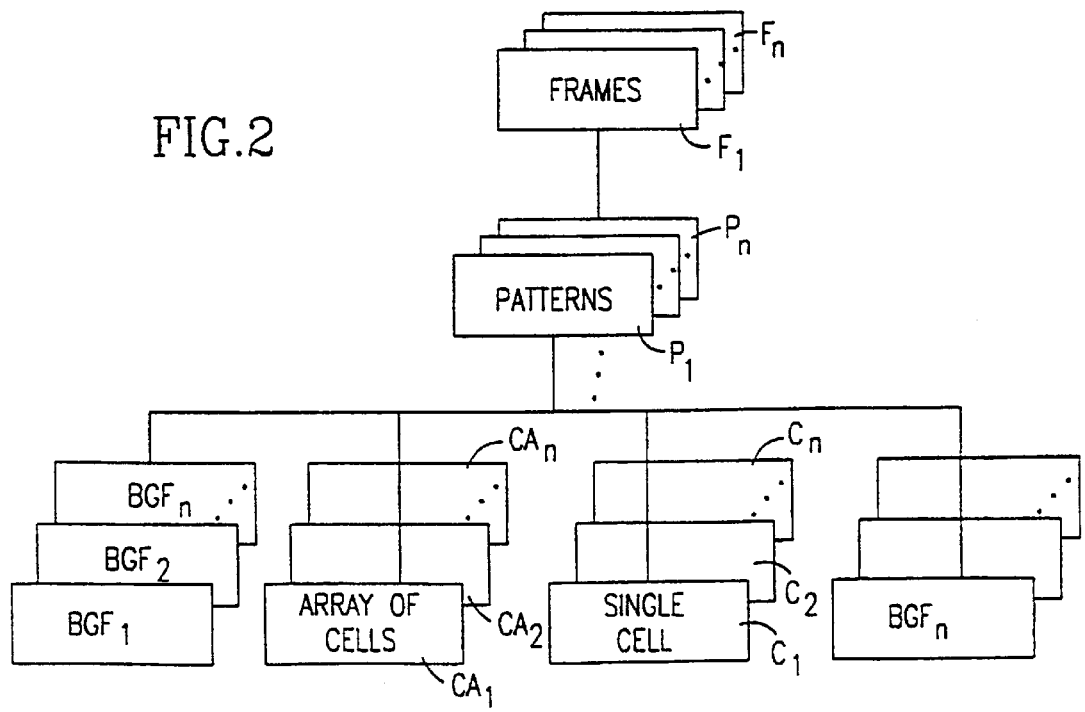
FIG. 2 illustrates various possible levels of the hierarchial compact format of the design data in the inspection system of FIG. 1.

FIG. 2 schematically illustrates the various levels of the design data in the database 5. In the description below, the design data is of a reference (defectless) mask (or reticle, wafer, etc.) to be used for optically inspecting a similar object (e.g., mask) for defects. Such design data would therefore include a plurality of frames $F_1$–$F_n$, each representing a mask for a layer of the wafer, each layer including a plurality of patterns $P_1$–$_n$, etc.

Figure 3:
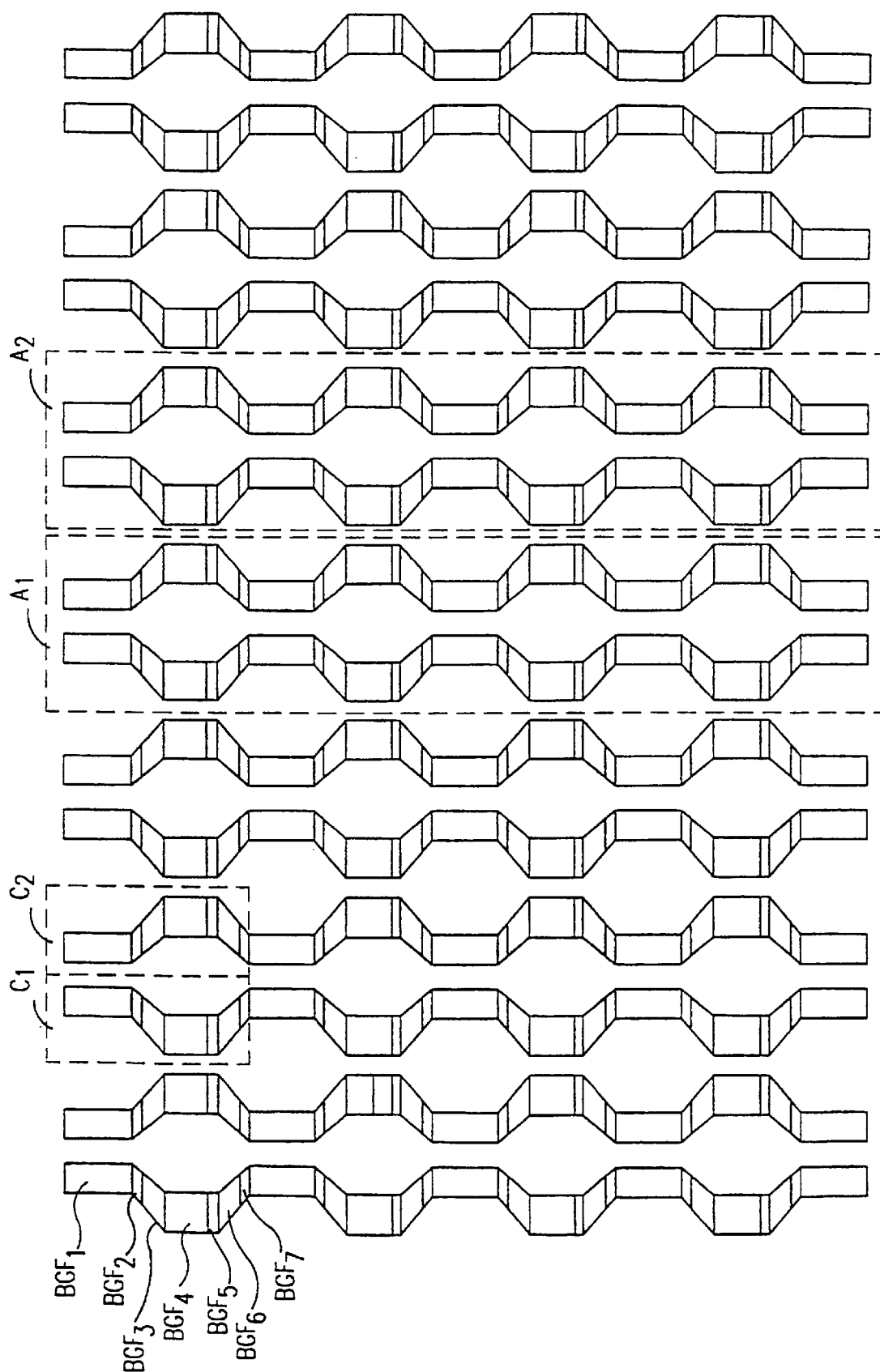
FIG. 3 illustrates an example of a detailed structure of a typical pattern in the hierarchial compact format of FIG. 2.
Figure 4:
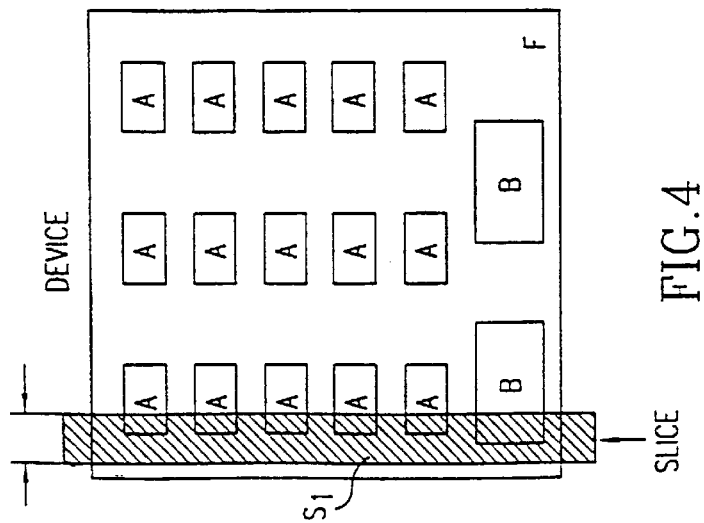
FIG. 4 illustrates an example of a frame containing a plurality of patterns and a slice which covers a portion of each one of a vertically extending patterns.

FIG. 4 illustrates one frame (layer) including 15 patterns A, and 2 patterns B; whereas FIG. 3 illustrates an example of one such pattern, e.g., pattern A. Each pattern includes a plurality of BGFs (Basic Geometrical Figures), schematically indicated as $BGF_1$–$BGF_n$ in FIG. 2. Since the BGFs appear repeatedly in the pattern, the main object of the compact format for the data is to describe only once each different BGF, and to identify with a minimum of data all locations of each BGF.

In the example described below, the BGF is of trapezoidal shape (i.e., a quadrilateral having two parallel sides), but it is contemplated that other shapes could be used, e.g., other polygons, lines, etc.

For this purpose, the compact data is also divided into a plurality of cells $C_1$–$C_n$, each including a plurality of BGFs; a plurality of arrays of BGFs, $BGFA_1$–$BGFA_n$; and a plurality of arrays of cells $CA_1$–$CA_n$. Such cells, arrays of BGFs, and arrays of cells, also appear many times in the pattern, and therefore the compact data may describe only once each such cell or array, and the various locations thereof in the pattern.

FIG. 3 illustrates an example of one such pattern as appearing in a 64 Mbit DRAM Cell Array. In this example, each BGF is of trapezoidal configuration, i.e., including two parallel sides. The trapezoids labelled $BGF_1$–$BGF_6$ in FIG. 3 illustrate six different BGFs in the pattern. FIG. 3 also illustrates by box $C_1$ a cell including a plurality of BGFs, and by box $A_1$ an array of a plurality of cells. It will be seen that the pattern illustrated in FIG. 3 includes a plurality of BGFs, a plurality of cells, and a plurality of arrays of cells.

FIG. 4 illustrates one frame (e.g., a layer) of a mask (or reticle or wafer) which includes a plurality of repeating patterns A, B. In the example illustrated in FIG. 4, there are 15 patterns A arranged in three vertical columns, and two patterns B arranged at the bottom of the frame; one is aligned with the first vertical column of patterns A, and the other interposed between the other two vertical columns of patterns A.

FIG. 4 also illustrates a slice $S_1$ of the frame, which covers a portion of each of the five patterns A in the first vertical column and the portion of the underlying pattern B. Such a slice may have a width of, e.g., 512, 1024 or 2048 pixels, according to the particular application. A wider slice contains, normally, more BGFs and naturally requires more computing time. It is therefore possible to adjust slice width so as to meet real-time requirements.

Slice $S_1$ therefore is all data in the HIF file 8 that is encompassed by the slice width. It should be noted that the data that constitutes a slice maintains the hierarchy and arrays of the original design data stored in HIF file 8.

As explained before, a frame or a mask consists of groups of BGFs that appear repeatedly on the mask. A group may be a pattern, an array of cells, a cell, array of BGFs etc, all as required and appropriate depending upon the particular application.

In the embodiment of FIG. 4, a group corresponds to a pattern which has 15 instances (pattern A) and two instances (pattern B). As shown in FIG. 5A each pattern is divided into three bins.

Those versed in the art will readily appreciate that the division of groups into constituent bins retains, effectively, the structure of the original design data (referred to herein as "structural correspondence to the input") Thus, from the location of a given BGF in a bin, and the location of the bin within a pattern, and the location of the latter within a frame, the location of the BGF in the frame can be derived.

Obviously, any repeating instance of a group will also have repeating instances of its bins constituents. Thus, if pattern A is divides into $a_1$ $a_2$ and $a_3$, then all 15 instances thereof in the frame (see FIG. 4), will each be divided into the same bin partition $a_1$ $a_2$ and $a_3$.

In the following discussion, "above" and "below" signify greater than or less than in terms of scanning direction. Thus, a first point is "above" a second point if it is scanned afterwards. Also, in the discussion below, a starting position of a bin is either the top or base side dimension thereof, depending upon the scanning direction.

As explained before, each bin contains BGFs of a given part-of a group. Each BGF in the group belongs to one and only one bin. By way of example, a BGF belongs to a bin if a leading edge thereof (i.e. the edge that will be scanned first) is "above" the starting position of the bin.

The bin height is the maximum offset between the bin base and the leading edge of the BGF that belongs to this bin. As will be explained in greater detail below, in the specific example described herein, the bin height is limited to be less than one window height.

Figure 5B:
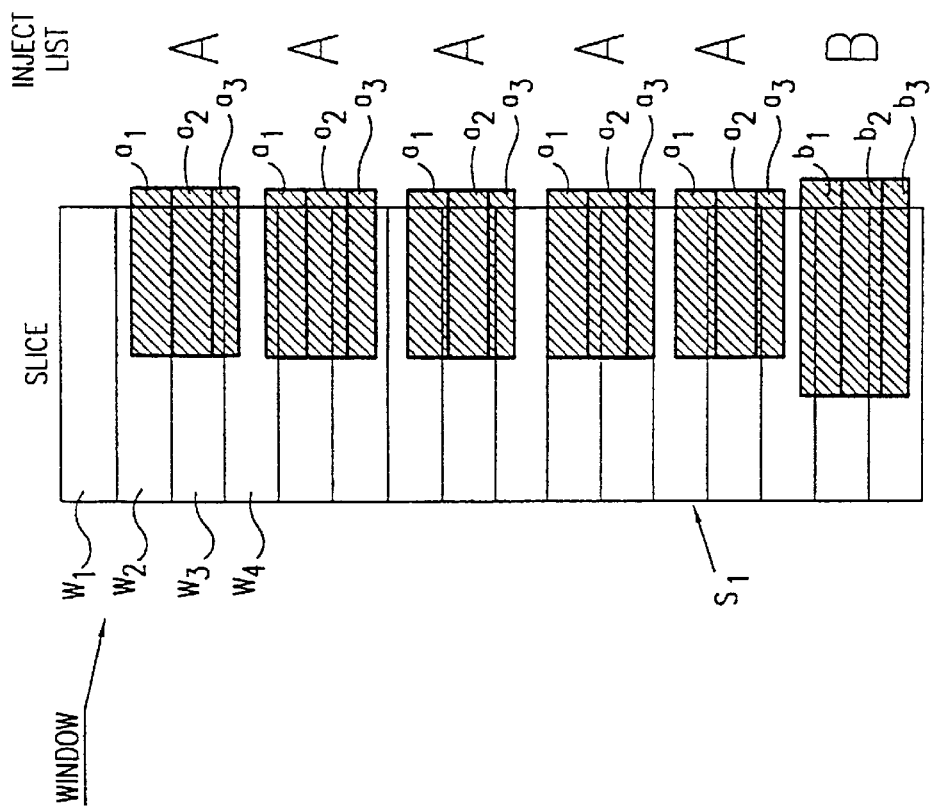
FIG. 5B illustrates the slice of FIG. 4 and the respective locations of the bins and windows in the slice.
Figure 5A:
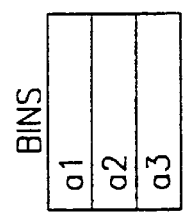
FIG. 5A illustrates a pattern A, of the kind depicted in FIG. 4, partitioned into three consecutive bins.

FIG. 5B illustrates the slice (hereinafter $s_1$) depicted in FIG. 4, with the corresponding patterns drawn in hashed lines, with each pattern divided into its respective bins. Thus, the portion of pattern A in slice $s_1$ is divided into three bins $a_1$ $a_2$ and $a_3$ whereas the portion of pattern B within slice $S_1$ is divided into three bins $b_1$ $b_2$ and $b_3$.

Bins $a_1$ are identical in all patterns, and the same applies to $a_2$ and $a_3$. Each bin can thus be identified by its location in the slice, e.g. according to the bin offset relative to the pattern and the offset of the latter relative to the slice base.

In the example of FIG. 5B, the identification of a given bin in the slice applies only to the Y coordinate (ordinate), since, as shown, all bins have the same X coordinate value (abscissa).

Also shown in FIG. 5B is the division of the same slice ($s_1$) into consecutive windows of identical height (of which only the first four $w_1$, $w_2$, $w_3$, $w_4$ are explicitly designated).

As recalled, the actual comparison between the real-time scanned data as obtained from module 3 and the defectless design data is effected at the "compare" module 4, by comparing a stream of pixels in respective scanned slice (as obtained from module 3) and a corresponding stream of pixels of a slice (in a real-time expanded format) that was produced by converting (in module 10) the reference defectless design data that is held in HIF format.

Accordingly, the trapezoid data in a slice in the reference defectless design data (which is held in "bin" representation) must be converted into a corresponding stream of pixels in the output format ready for comparison. In order to obtain the output expanded format the slice is divided into "window" representation and the BGF data in the bins are processed and allocated to the respective windows. The BGFs in the window are then transformed to sequence of lines of pixels and after undergoing so called rasterization the resulting data (which is now in the real time expanded format) is ready for comparison against the stream of pixels that originate from the inspected mask.

The window representation constitutes structural correspondence to the output, whereas the bin representation constitutes structural correspondence to the input. It should be noted that structural correspondence to output does not necessarily entail the window representation.

Since "bins" and "windows" are dependent upon different constraints (i.e the former is correlated to the input HIF representation of the mask whereas the latter is correlated to a sequence of pixels that conforms to the format of the scanned mask), they normally do not coincide, as is clearly shown in FIG. 5B. Put differently, the bin bottom and top sides do not normally coincide with the bottom and top sides of a window.

In the example under consideration, the bin height is selected to be less than a window height, and accordingly, a bin may either be wholly contained in a window (e.g. $a_1$ and $a_2$ within $w_2$ and $w_3$, respectively) or overlapping a pair of adjacent windows (e.g. $a_3$ overlapping portions of $w_3$ and $w_4$). The BGFs of a given bin may, likewise, be included in one or two adjacent windows.

The foregoing arrangement wherein slices are divided into bins which retain structural correspondence to the design input, and the same slice is divided to windows which retain structural correspondence to the output enable embodiments of the present invention to meet the "real-time" nature of the comparison as explained above. Thus, the data (BGF data) contained in a given bin is processed and allocated to one or at most two adjacent windows.

The processing and allocation procedure is relatively low-cost (in terms of processing time and memory resources) since, as recalled, the determination of window location within a slice is readily available and, likewise, the location of the BGFs within the bins is known (when the pattern is divided into bins) and the location of the bin within the slice is readily available (i.e. according to the offset of the bin within the pattern and the offset of the pattern within the slice).

Another characteristic which facilitates the real-time comparison is that the preliminary allocation of BGFs into the bins can be effected before transforming them into bins and that such allocation is required only once for all instances of the same bin, since, obviously, the occurrence of BGFs within a given bin is duplicated in any instance thereof. Put differently, all $a_1$ bins have the same BGFs at exactly the same locations relative to the bin base. Conversely, had it been required to process all BGF data that is contained in a given slice and map it to a given window (18 bins in slice $s_1$ of FIG. 5B), and not to limit the processing only to those that belong to different bins (6 bins in $s_1$ of FIG. 5B), the resulting hardware and software resources (i.e. processing time and memory) that would have to be allocated to this end, could render the operation of convertor 10 practically unfeasible.

Overall Construction of the Data Converter 10

Figure 7:
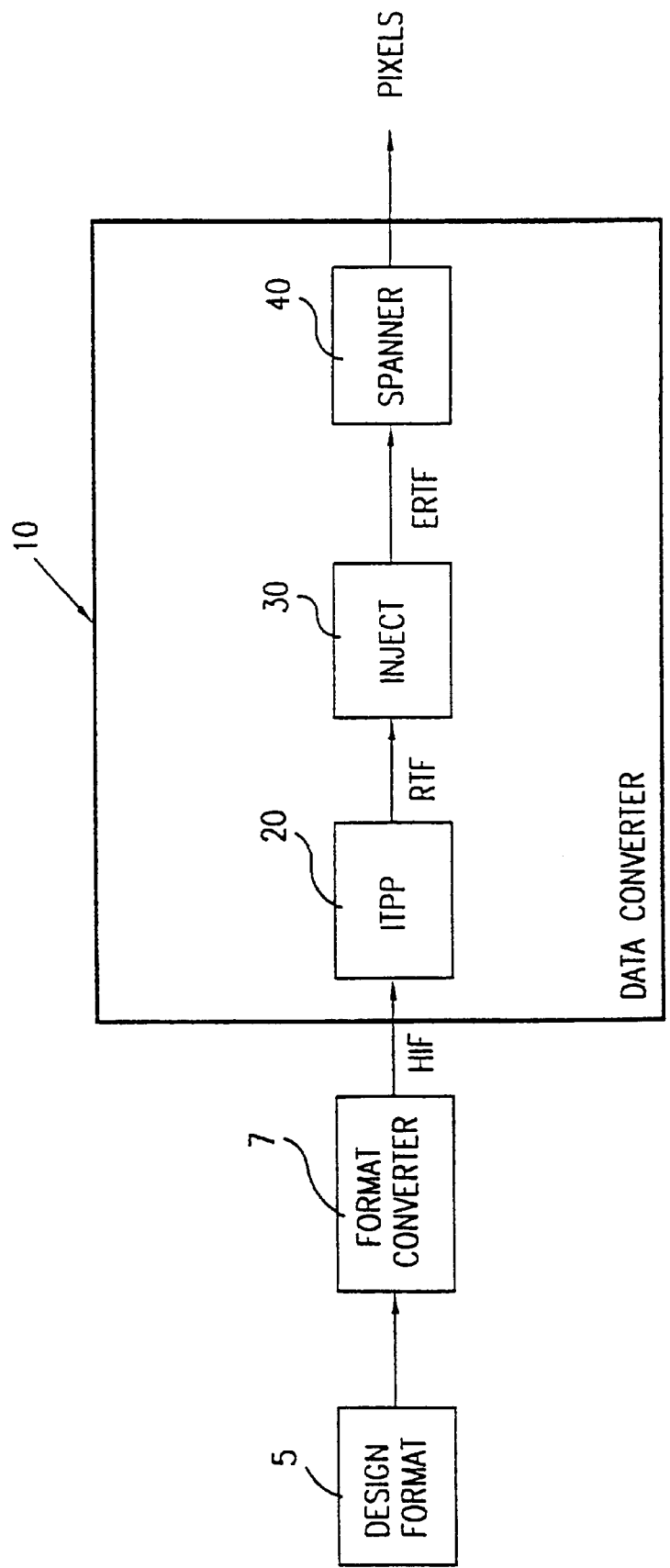
FIG. 7 is an overall block diagram of one form of data converter apparatus in accordance with the present invention.

FIG. 7 is a block diagram illustrating the overall construction of the data converter 10 shown in FIG. 1. As indicated earlier, data converter 10 processes a slice of the data which originally had been in the HIF design format 5 and changed to the HIF format by pre-processor 7.

In this connection, it should be noted that the design data 5 is normally produced by commercially available design tools such as CATS. Such data includes HIF representation of the masks as well as pertinent mathematical transformations such as mirroring, reverse, scale, sizing and others. Pre-processor 7 preferably applies the set of graphical transformations to the raw data and performs logical "or" operations on the various representations of a mask portion, so as to bring about a comprehensive HIF representation of a given reference defectless mask, which will be compared to data that corresponds to actual inspected mask. It should be noted that whilst, preferably, the pre-processor 7 executes the specified transformations, this is not obligatory and accordingly, by an alternative embodiment, various transformations that may be realized virtually in real-time are performed by the data converter. Each slice of data is converted into a series of pixels (in real-time expanded format) that will be compared against corresponding series of pixels of the inspected object as produced by inspection system 3 (FIG. 1). By a preferred embodiment, as the data converter 10 outputs the data of one slice in the real-time expanded format, it reads and converts the data for the next slice, so that the output of the data converter will be a continuous stream of design data at the same rate as the object data outputted by the inspection system.

The data converter shown in block 10 in FIG. 7 includes means for performing the following three main operations:

The first operation is performed by an inspection time pre-processor (ITPP) 20, which selects the data stored in compact form in the HIF file 8 relating to a predefined division, in this case islice as illustrated in FIGS. 4 and 5 ITPP 20 then divides groups that are included in the division into a plurality of bins, and determines the number of times each bin is present in the respective division. In this case, each unique pattern (A and B in FIG. 4) is divided into distinct bins ($a_1$, $a_2$, $a_3$, $b_1$, $b_2$ and $b_3$). ITTP 20 outputs a list of the bins, the number of times they are present in the respective division (specifically slice), and their location in the respective division (specifically slice). As will be explained in greater detail below, this data is stored in a real time compacted format (RTF).

The second operation of data converter 10 is performed by an injector 30. Injector 30 retrieves the data from the ITPP 20, and performs a partial expansion of such data by inserting all the repetitions of the bins. Thus, injector 30 converts the list of bins and their locations in the respective slice, as received from the ITPP, to a serial list of the bins in the respective slice. This information is outputted in real-time format (RTF) to a spanner 40.

Spanner 40 compiles the partial expansion of the data by expanding and transforming each of the bins into pixels (in real-time format) used in the inspection process.

The construction and operation of the ITPP 20, injector 30, and spanner 40, are described more particularly below with reference to FIGS. 8–14.

ITPP (Inspection Time Pre-Processor) 20

Figure 8:
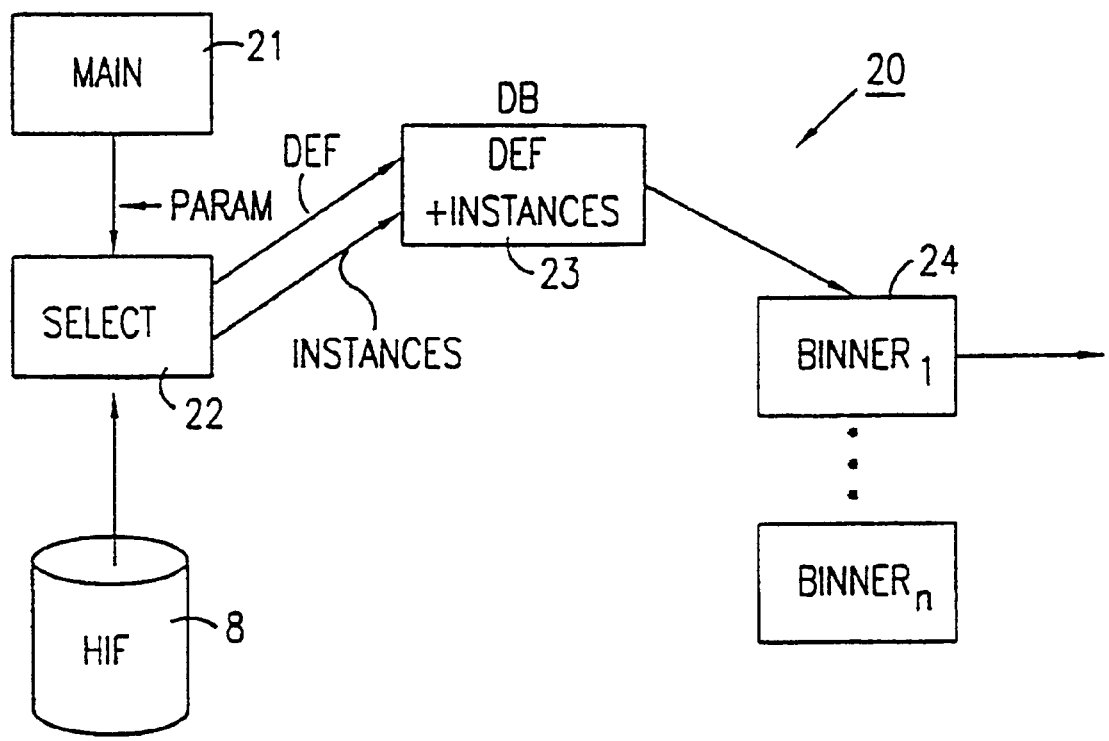
FIG. 8 is a block diagram illustrating an ITPP (Inspection Time Pre-Processor) in the data converter apparatus of FIG. 7.
Figure 9:
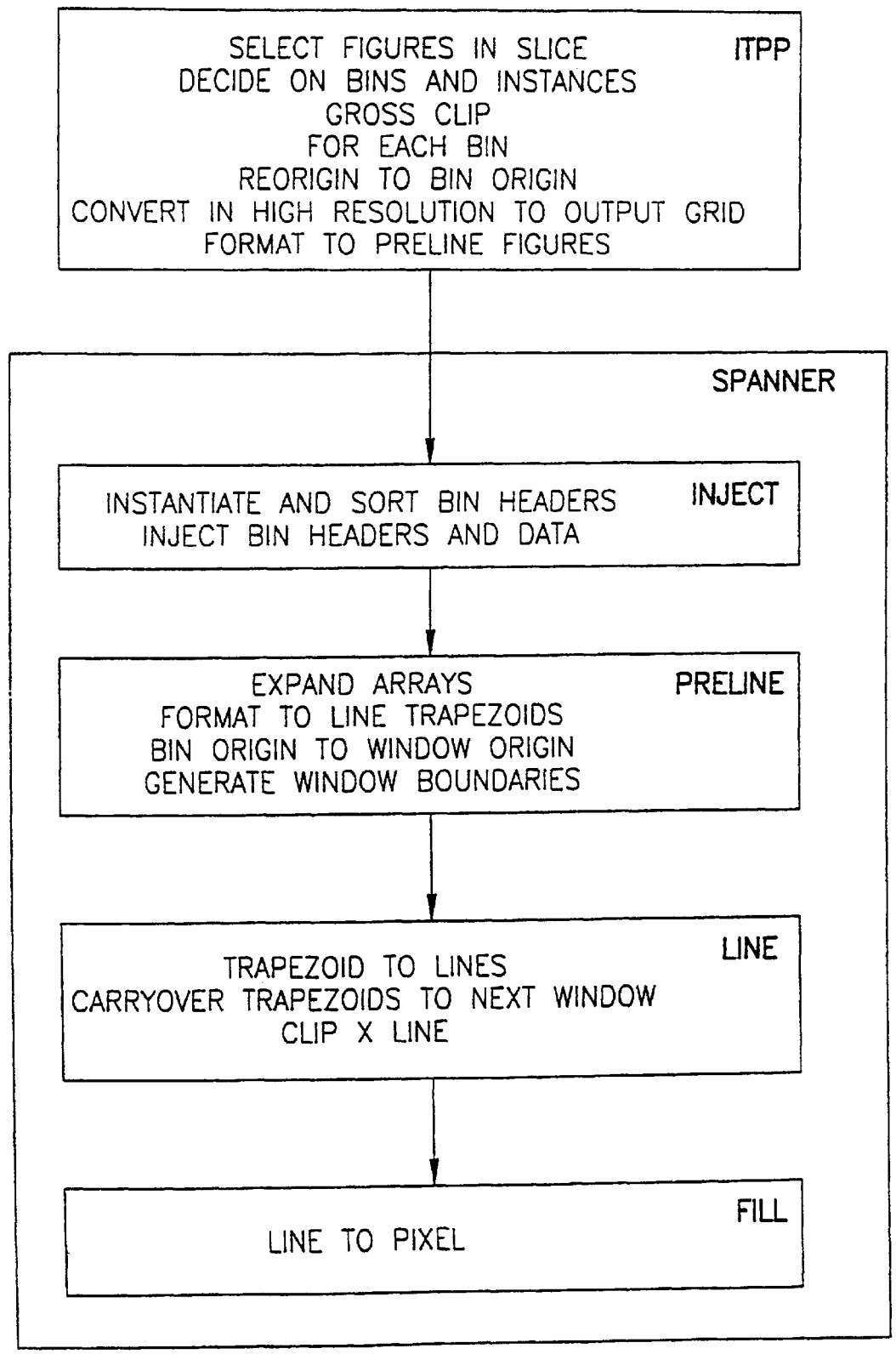
FIG. 9 illustrates an example of a flow chart of a typical sequence of operation in an optical inspection system of FIG. 1.

The operations performed by ITPP 20 are illustrated in FIG. 8 and FIG. 9. It includes a main program 21 which defines the parameters of the respective slice (e.g., $s_1$, FIGS. 4, 5), by setting forth the beginning and ending coordinates, and then effects a select operation (box 22) of the so-defined data from the HIF file 8. Each of the features within the pattern data so selected (e.g., trapezoids, cells, arrays) is defined and stored in a database store 23. The latter also stores the number of instances of each such stored feature and location.

ITPP 20 divides each pattern in the respective slice into bins utilizing to this end concurrent module $Binner_1$ to $Binner_{n1}$. Thus, as shown in FIG. 5A, the portion of pattern A within the slice $S_1$ is divided vertically into the three bins $a_1$–$a_3$. Pattern B within slice $S_1$ will be divided into bins $b_1$–$b_3$. Thus, slice $S_1$ would be described as including five bin instances $a_1$, five bin instances $a_2$, five bin instances $a_3$, and one bin each of $b_1$, $b_2$ and $b_3$.

The output of ITPP 20, therefore, is a list of all the bins in the respective slice, the number of times each bin appears in the respective slice, and the relative location of each bin in the respective slice. This information is fed in real-time format (RTF) to the injector 30. ps Injector 30

Injector 30 accesses a memory (not shown) which stores all the bins outputted by ITPP 20 of the A and B patterns, respectively, within the respective slice, a list of the number of times that each bin appears, and the locations of each bin instance. The memory outputs this information to a CPU (not shown), which organizes the data and outputs a list including all the bins and their locations according to the scanning order. Thus, injector 30 partially expands the data and produces an inject list of bins, which will be as follows in the example illustrated in FIG. 5C, $a_1$ (plus its offset from the start of the respective slice), $a_2$ (plus its offset), $a_3$ (plus its offset), $a_1$ (plus its offset), $a_2$ (plus its offset), . . . (etc.) $b_1$ (plus its offset), $b_3$ (plus its offset), and $b_3$ (plus its offset). The Spanner (FIGS. 9–14)

Figure 10:
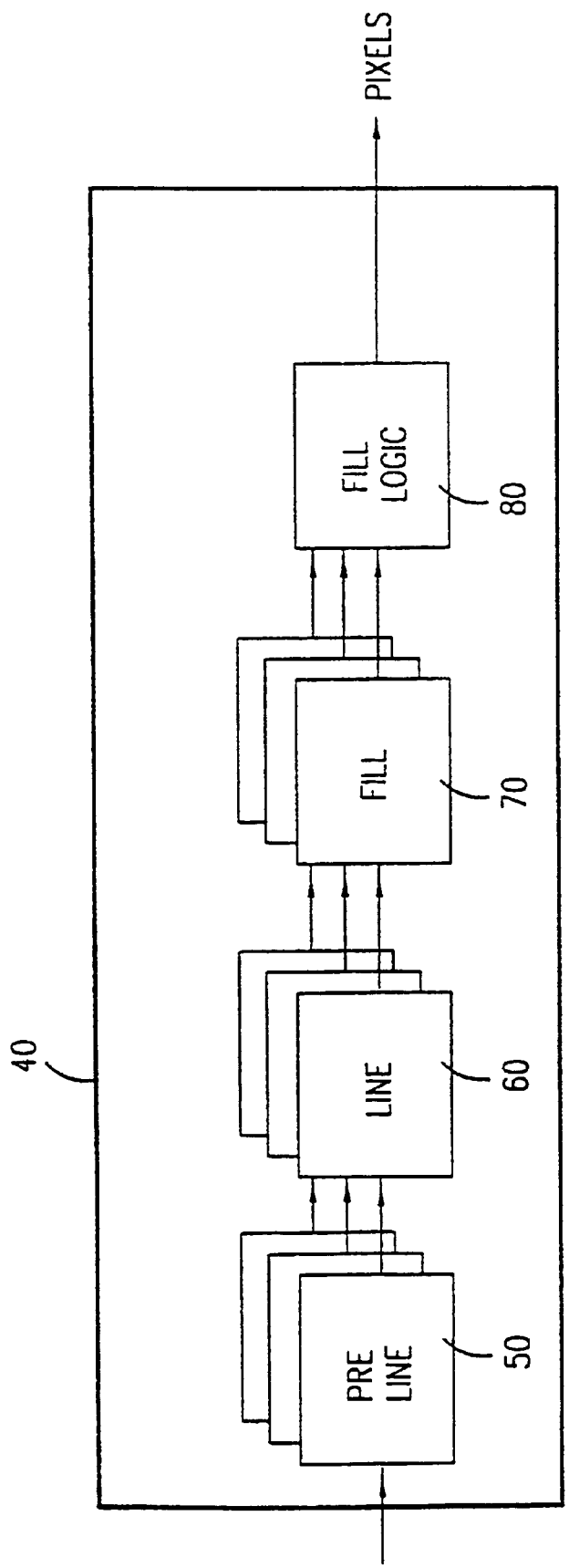
FIG. 10 is a block diagram illustrating one form of spanner for performing the final expansion in the data converter apparatus of FIG. 7.

Spanner 40 receives the data for the respective slice $s_1$ as selected by ITPP 20, and as partially expanded by injector 30, and completes the expansion of this data before it is fed to the comparator 4 (FIG. 1), for comparison with the object data generated during the inspection process. The overall construction of spanner 40 is illustrated in FIG. 10. Its basic components are one or more pre-line machines 50 illustrated in FIG. 11, one or more line machines 60 illustrated in FIG. 12, one or more fill machines 70 illustrated in FIG. 13, and a fill logic machine 80 illustrated in FIG. 14. The latter outputs the originally compacted data into a fully-expanded real-time format for use in the inspection process.

Figure 5C:
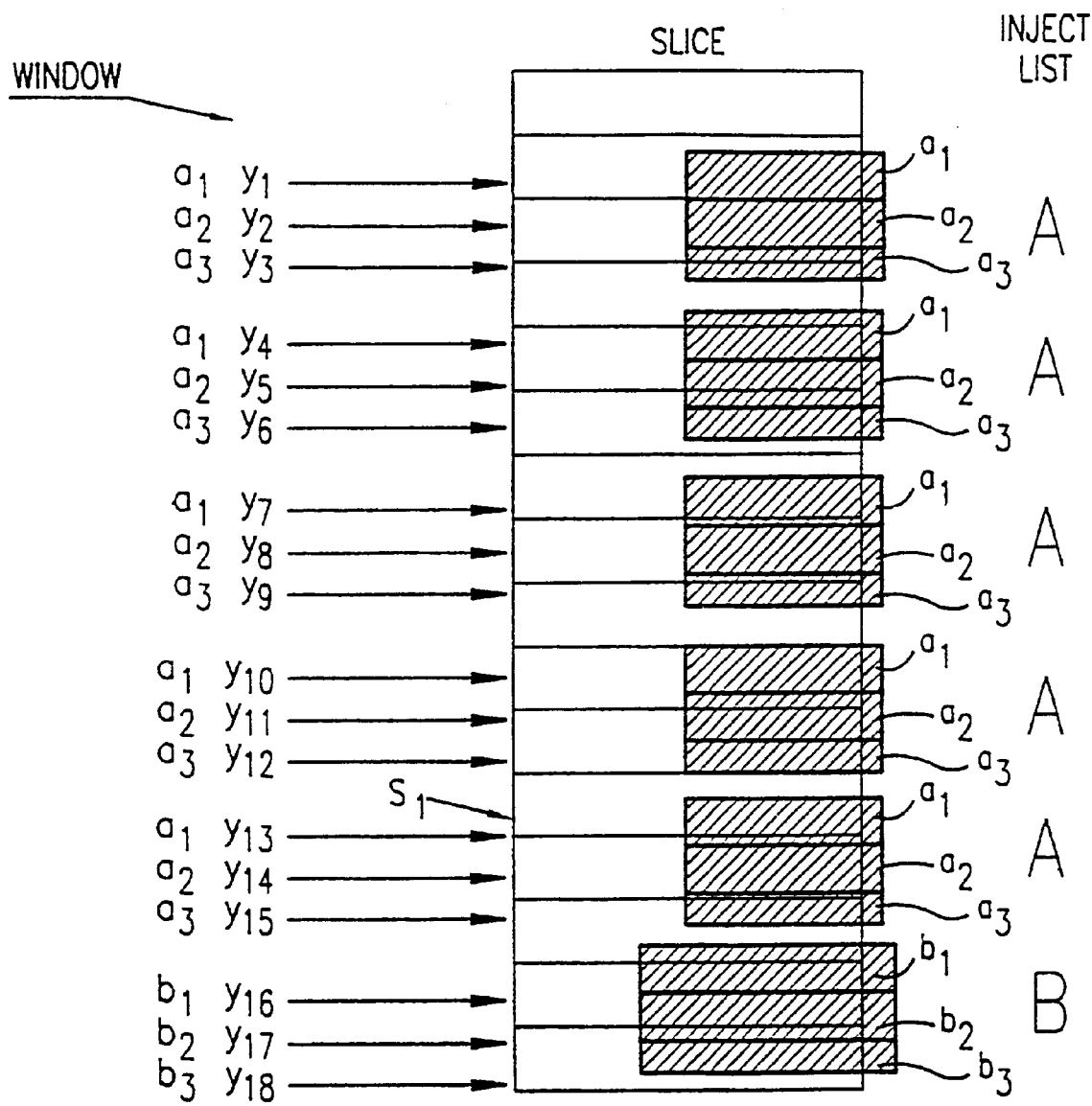
FIG. 5C illustrates an inject list of the bins that are depicted in FIG. 5A.
Figure 11:
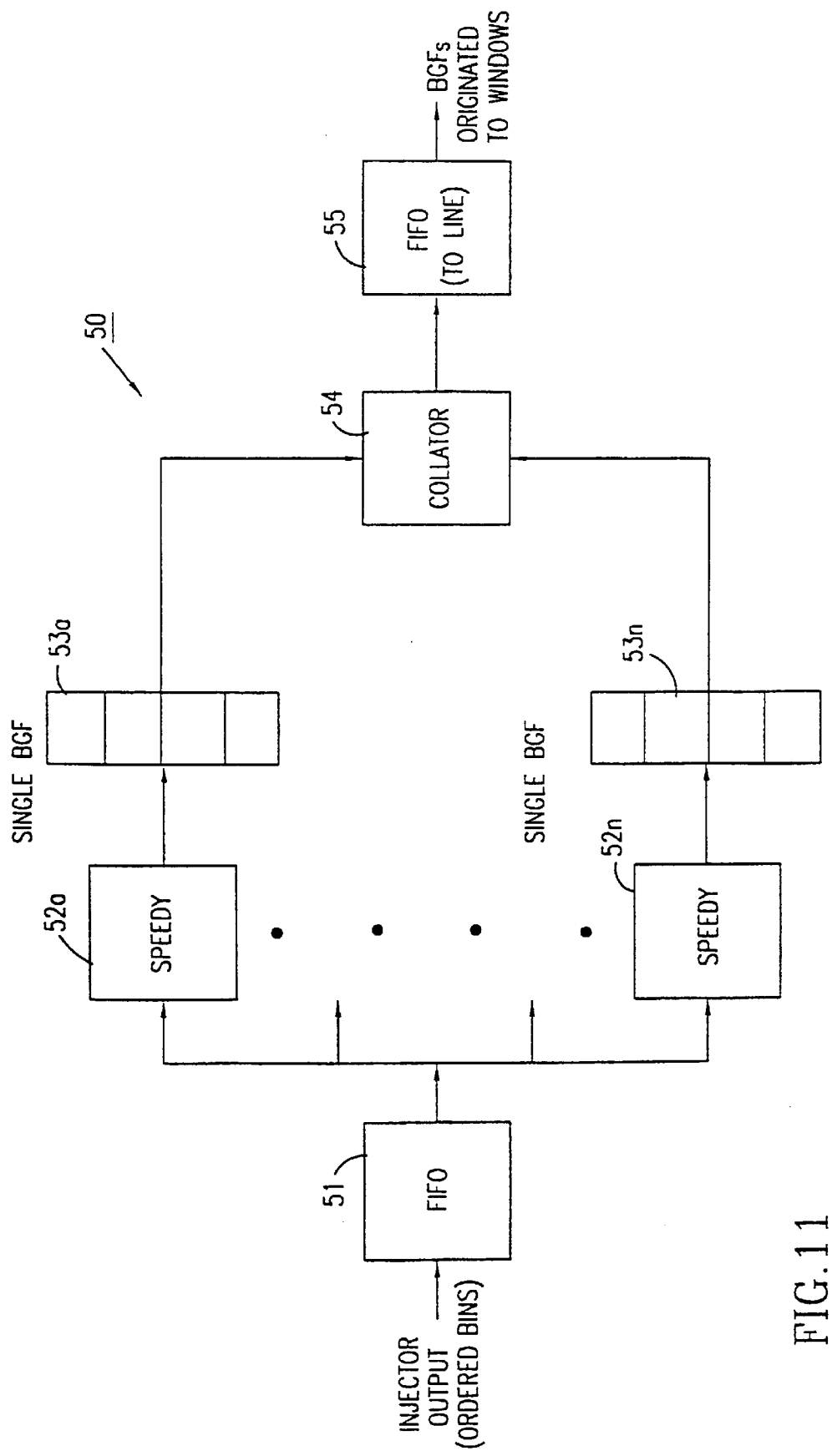
FIG. 11 is a block diagram illustrating one form of Pre-line system in the spanner of FIG. 10.

The pre-line machine 50, as shown in FIG. 11, receives from the injector 30 into a FIFO register 51 the inject list according to scan order (e.g. in a Y coordinate descending or ascending order as the case may be as depicted in FIG. 5c). The data received into FIFO register 51 is distributed to a plurality of parallel processors 52a–52n. These processors, acting in parallel, expand each cell or array into the respective BGFs, and format each BGF with coordinates relative to the window boundaries. More specifically bin header data is broadcasted from FIFO 51 to each respective processor 52; the latter determines at first whether the bin under consideration at least partially overlaps the current window. By way of example, this may be implemented by ascertaining whether the bin base (i.e. the Y coordinate thereof) resides between the top and base Y coordinate boundaries of the window under consideration. In the case of affirmative conclusion (hereinafter inside window boundaries), the BGFs of the bin will be processed and allocated concurrently (by processors 52a–52n) to the current and possibly to the next window.

Figure 12:
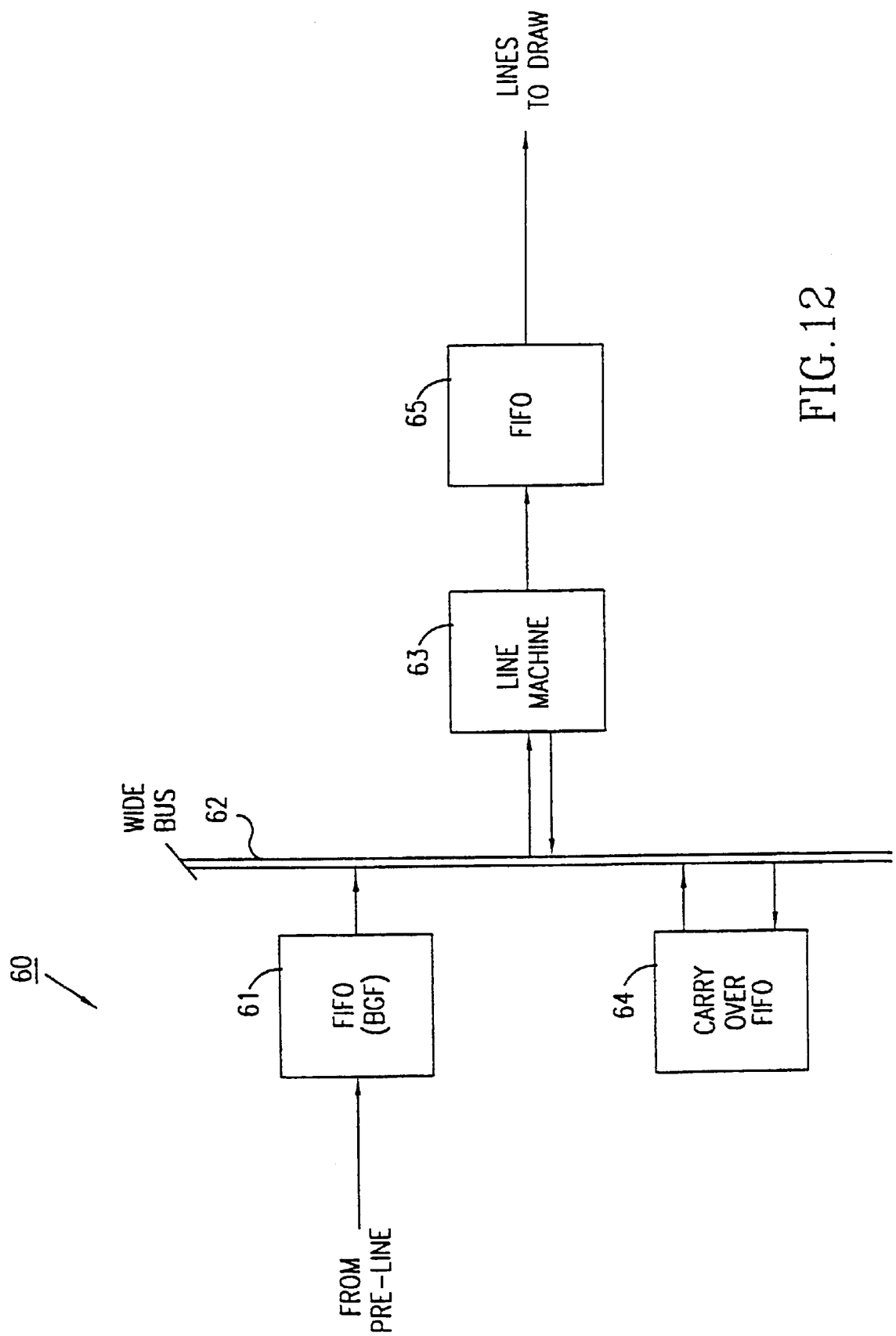
FIG. 12 is a block diagram illustrating one form of Line Machine in the spanner of FIG. 10.

If, however, the bin processed by each respective processor 52 is not accommodated in the current window (hereinafter outside window boundaries), it readily arises that all bin data (originated from previous bins) relating to the current window have been fully processed and accordingly the data stream relating to the current window (window data stream) may proceed to the next processing stage, i.e. line processing as illustrated in FIG. 12.

It should be noted that providing a plurality of processors 52a–52n operating in parallel greatly speeds up this processing of the data, and also makes the processing operations scaleable so that processors can be added or removed, according to the amount of data to be processed.

Reverting now in FIG. 11 to the "inside window boundary" state, then each succession of n BGFs from among the BGFs accommodated in the bin are processed concurrently by processors 52a–52n, respectively. Such processing in each processor includes:

(i) reorigining the BGF from bin relative to window relative Y coordinate;

(ii) exploding the BGF arrays to distinct BGFs;

(iii) rounding the Y coordinates to the appropriate output (pixel) row and height. (X coordinates are retained in subpixel accuracy at this point); and (iv) each trapezoid is marked as belonging to either the current window or the next window.

Since as explained above, the bin height is limited to being less than a window height, and further bearing in mind than the bin base does not normally coincide with the corresponding window's base, then all BGFs must belong to either the current window or the next window.

The output of each processed BGF (in window boundary) is delivered by its respective processor (52a–52n) to respective buffers (53a–53n) and the data stored in the specified buffers are then forwarded by means of collator 54 to FIFO buffer 55, and therefrom to line machine 60.

By the particular embodiment depicted in FIG. 11, since the preline module processes each BGF, multiple processors can handle BGFs in parallel. Optimal performance is achieved by having a single queue of BGFs. Each processor has an input buffer of a single BGF. When each processor removes its BGF from the input queue and starts to process it, a BGF distribution mechanism reads the common input FIFO of data from the Injector 30 and moves the next input figure to an available input buffer of a BGF processor. In this way even if one processor is busy processing a large array, (i.e. the distinct BGFs that constitute an array of BGFs) other processors can continue processing the input queue. The copying of data from the main input FIFO to the processor input buffer is also performed concurrently to figure processing.

The collator (54 in FIG. 11) mechanism polls the output registers and merges the output from each processor into a single stream directed to the LINE input FIFO 55. Each processor outputs its output to the register and can continue processing the next BGF, in the meantime.

As specified before, in order to determine whether the bin is included in the current window (i.e. whether its Y base coordinate resides between the top-bottom boundaries of the current window), the bin header is broadcasted from FIFO 51 and sent to all processors. It is only the individual BGFs of the bin that are distributed between the processors. In this way all processors decide together on the need to generate a new window, e.g. when the bin base address is above the Y coordinate that corresponds to the top side of the current window. In the latter case, each processor generates a window end signal and then polls an input bit controlled by the collator. The collator has a special synchronization mechanism which waits until all processors have output a window end signal, it then releases all the processors for further processing by setting the bit polled by the processes, which will result in processing and allocating the BGFs of the bin to the next window according to scan order.

Each processor 52–52n stores the BGFs in registers 53a–53n at the output speed of the processor. This data is collated in a collator 54 as it becomes available and is fed to an output FIFO register 55.

The output of each pre-line 50, therefore, is the data content of the BGFs, plus the window boundaries.

As shown in the specific embodiment of FIG. 12, each line machine 60 includes an input FIFO register 61 which receives the BGF data plus the window boundary from the pre-line machine 50. This data is outputted via a wide bus 62 to a line circuit 63 which breaks the data within the BGFs into lines for the respective window, and defines the boundaries of each line. Any data within a BGF belonging to the next window is fed back to a carry-over FIFO register 64. The line machine 63 outputs a list of pairs of coordinates that define the lines of pixels for that window. This data is stored in an output FIFO register 65.

Thus, the line machine 60 receives from the preline module 50 a stream of windows markers and trapezoids. The trapezoids are defined as:

(a) left and right X coordinates in fractional pixel accuracy;

(b) the starting row of the trapezoid in pixel accuracy;

(c) the height of the trapezoid in pixel accuracy;

(d) the amount to add to each of the left and right X coordinates for each additional row; and (e) an indication if the trapezoid belongs to the current window or not.

The stream is also marked at the start and end of the slice data.

The line machine module 60 reads each trapezoid in turn (from FIFO 61) and if it belongs to the next window it is put into carry over FIFO 64, if not, it is converted into a series of scan lines consisting, each, of row, the start X pixel and the line length. These scan lines are then input by the fill module which draws the lines into the frame buffer (see FIG. 13).

More specifically, the line machine module 60 processes each trapezoid by storing the X coordinates of the base of the trapezoids, rounding the X coordinate to the output pixel grid, and calculating the line length (right coordinate minus the left coordinate). The row is then increased by one and the height decreased by one. This process is iterated until either all rows of the trapezoid are converted to the output form, or until the edge of the window is reached. If the edge of the window is reached then the current X left and right coordinates, row and height along with the X row increments are stored as new BGFs in the carry over buffer 64. Note that this is the same carry over buffer that was used to store trapezoids that were totally contained in the next window on input in the line.

When a new window is started, the line mechanism first reads all trapezoids from the carry over buffer (which were stored therein when processing previous window(s)) and treats them in the same way that it treats trapezoids from the input FIFO buffer 61 as explained above. Note that this includes the possibility of generating new figures into the carry over buffer (for very tall figures). This mechanism prevents the need for clipping in the Y direction in most cases, and further reduces the amount of processing in the system, thus contributing to the feasibility of the system.

The apparatus can include a plurality of line machines 60 operating in parallel, with each one processing one window or part of a window. This shortens the processing time and also contributes to the scaleability of the converter of the invention.

Figure 13:
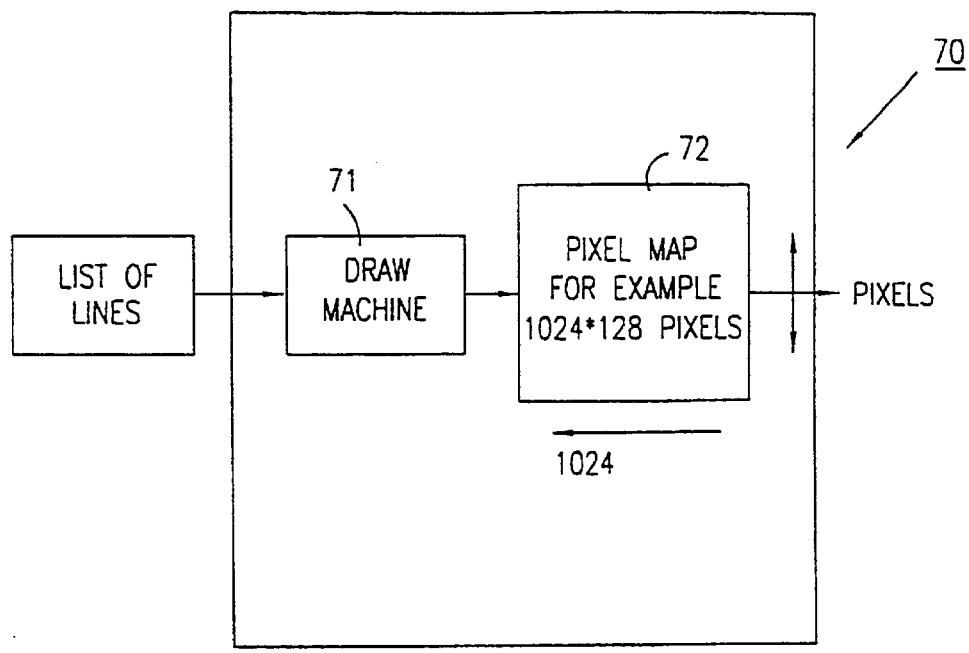
FIG. 13 is a block diagram illustrating one form of Fill Machine in the spanner of FIG. 10.

The output of the line machine 60 is fed to a fill machine 70, as illustrated in FIG. 13. Fill machine 70 receives a list of lines of the BGFs from the line machine and includes a draw machine 71 and a framed buffer 72 in which the list of lines is drawn. Preferably, there should be at least two fill machines 70, one for the currently inspected window, and the other for the next window, since drawing the lines in the frame buffer must be completed before starting inspection of that window area. The fill machine 70 also preferably contains several (e.g., six) draw machines 71 that read the input from the line machine in parallel and access the same frame buffer 72. This is achieved by organizing the frame buffer 72 in banks that correspond to the drawing machine.

The fill machine 70 can also be replicated in order to gain more time for drawing the lines in the frame buffer, and also to be able to handle different data types.

Figure 14:
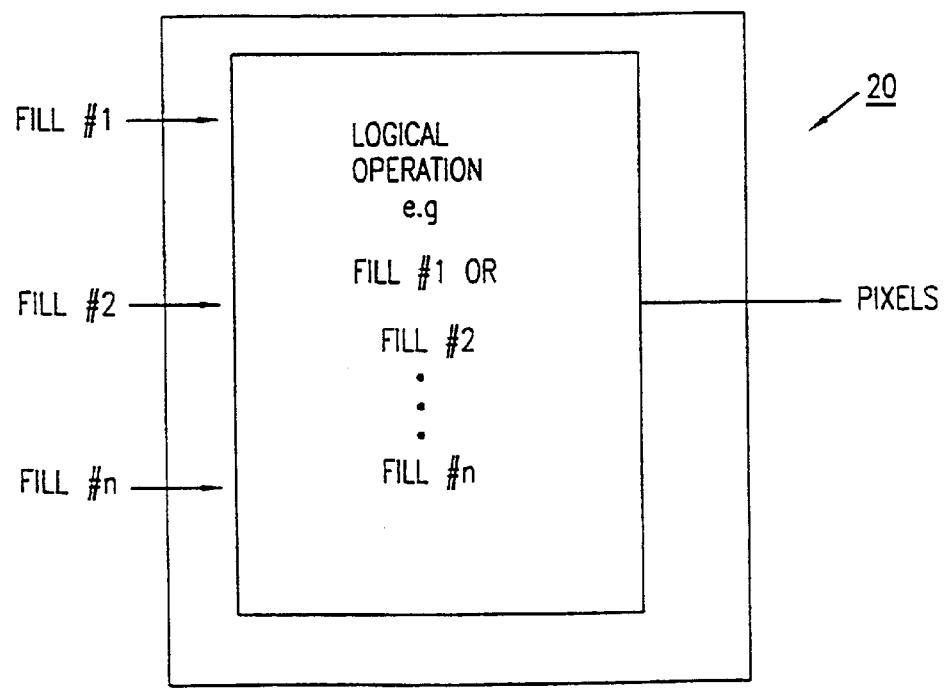
FIG. 14 is a block diagram illustrating one form of Fill-Logic circuit in the spanner of FIG. 10.

The output of the fill machine 70 is fed to a fill logic circuit 80 shown in FIG. 14. This circuit combines the data types to the desired format required by the inspection machine. In the example illustrated in FIG. 14, the fill logic circuit 80 receives the outputs of all the fill machines and performs the appropriate logical operations, as indicated in FIG. 14. This machine can be programmed to perform any needed operation.

Figure 6A:
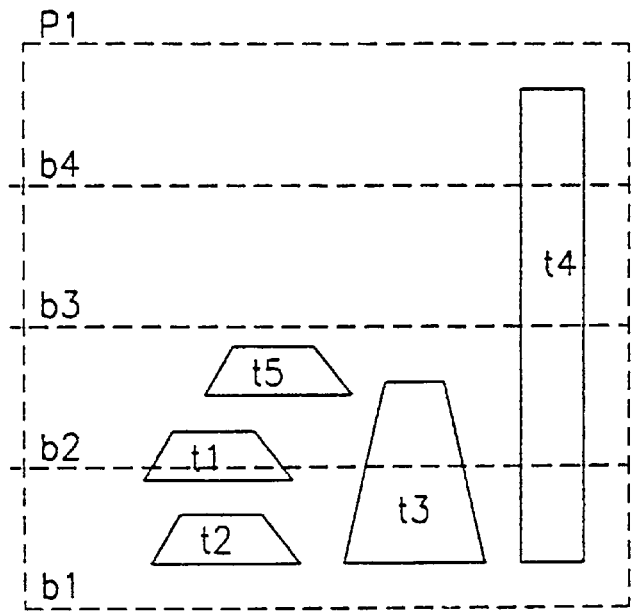
Figure 6B:
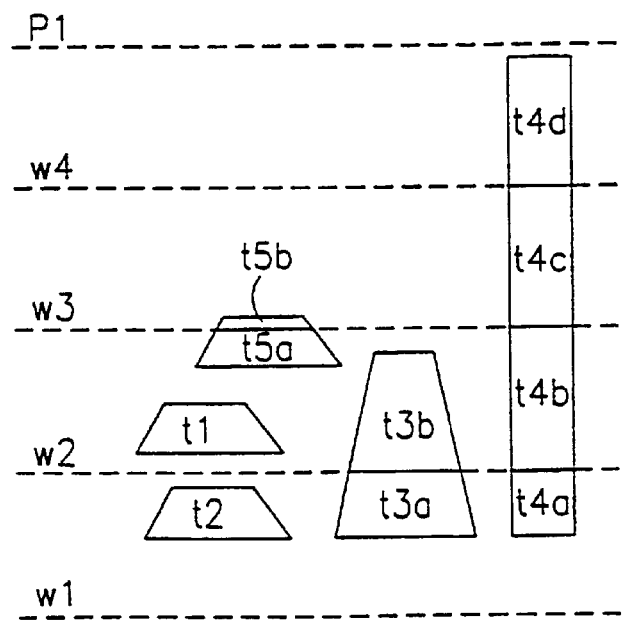

According to preferred embodiments of the invention, time consuming clipping operations are almost completely obviated. Thus, the carry over FIFO mechanism which deals with BGFs that exceed window top boundary, inherently saves clipping operation in the Y coordinate. Thus, as shown in FIGS. 6A and 6B, due to the carry over FIFO, the $t_1$ trapezoid (belonging to $b_1$) is wholly contained in $w_2$ and therefore is wholly forwarded to the FIFO for future process in $w_2$; $t_2$ trapezoid (belonging to $b_1$) is wholly contained in $w_1$ and is therefore processed in its entirety in $w_1$; $t_3$ is partially processed in $w_1$ ($t3_a$) and partially forwarded to the carry over FIFO ($t3_b$) for processing in $w_2$; $t_4$ is likewise processed in $w_1$ ($t4_a$), the remaining portion is forwarded to the carry over FIFO and processed in $w_2$ ($t4_b$), the remaining portions will, likewise, be processed by $w_3$ and $w_4$ ($t4_c$ and $t4_d$, respectively).

The X coordinate clipping is partially performed in the line machine 60 module. Thus, if the line left (or right) coordinates is less than (greater than) the slice left (right) edge then the coordinate is converted to the edge itself. By allowing figures to extend to a larger area than the slice are (for example twice as wide), most X coordinate BGF clipping (which is a time-consuming software task) can be reduced to line clipping in the manner specified which can be realized by fast and relatively simple hardware circuitry as explained above. What remains to be done is to perform time-consuming X coordinate clipping only to those trapezoid which exceed the extended slice. Since, however, only few trapezoid meet the latter criterion, the overhead imposed by applying clipping operations to these trapezoid is minimized. The X coordinate clipping is illustrated in FIGS. 6C, 6D and 6E. Thus, trapezoid $t_3$ that is wholly contained in the ordinary slice width is not subjected to any clipping. $t_2$ which extends over the ordinary slice width, but is contained in the extended slice width (being in this case bin width) undergoes clipping (preferably hardware-based) in which the right and left edges thereof are aligned to the edges of the extended slice (FIG. 6c). $t_1$, which extends over he extended slice undergoes conventional (and time consuming) clipping as depicted in FIG. 6D and further undergoes clipping (preferably hardware-based) as depicted in FIG. 6E.

Those versed in the art will readily appreciate that the realization of a system and method of the invention is not bound by the specific example that was described with reference to the accompanying drawings. Thus, by way of a non-limiting example, the constraint that bin height is lower than window height with the consequence that trapezoid included in the bin belongs either to the current or subsequent window is of course not obligatory. By way of another non-limiting example, the utilization of collator and its associated window synchronizing mechanism as described above is likewise not obligatory. Other variants are applicable all as required and appropriate depending upon the particular application.

Summary of Operation of Overall System

The optical inspection of the object (e.g., mask 2, FIG. 1) is done by comparing the output of the optical inspection system 3 with the design data for the object as appearing in database 5. Before the inspection process, this design data is converted by pre-processor 7 to a continuous file in HIF compact format 8, wherein the design data (after having been subjected to graphic transformation such as mirroring, scale, sizing, etc.) is constituted of a plurality of predefined basic geometric figures (BGFs) such as trapezoids, and all the repetitions of such BGFs.

During the inspection process, this design data in compacted form is fed from the HIF file 8 to the data converter 10, which converts the data into a series of pixels in real-time expanded format corresponding to that in which the object data is outputted by the optical inspection system 3 to the comparator 4. The ITPP 20 of data converter 10 defines the parameters of the slice to be processed, e.g. the starting and ending coordinates, and selects the appropriate data of the slice from the HIF file 8. ITPP 20 also divides the pattern data in each slice into bins (FIGS. 5A, 5B), and prepares a list of the different bins, the number of such bins, and their respective locations in the slice.

This data is outputted by ITPP in real-time format (RFT) to the injector 30 which performs a partial expansion of this data by outputting an inject list of all the bins in the respective slice and their locations in the slice sorted according to scan order. This data is outputted to the spanner 40 which performs the final expansion of the bins to reproduce the data therein into the real-time expanded format for use in comparing same with the object data derived from the optical inspection machine 3.

It will be seen that the described system performs, preferably, many processing operations in parallel, e.g., parallel processors 52a,52n in the pre-line system 50, enabling the system to accommodate the data required for any particular application by adding or reducing processors. In addition, during the inspection time, the system can analyze the volume and density of the data for the next slice and determine the width of the next slice so as to provide an inspection speed of maximum rate. By a preferred embodiment, a carry over FIFO mechanism, and utilizing extended slice approach in machine line 60 module, reduced almost entirely the necessity to apply costly BGF clipping operations.

Figure 15:
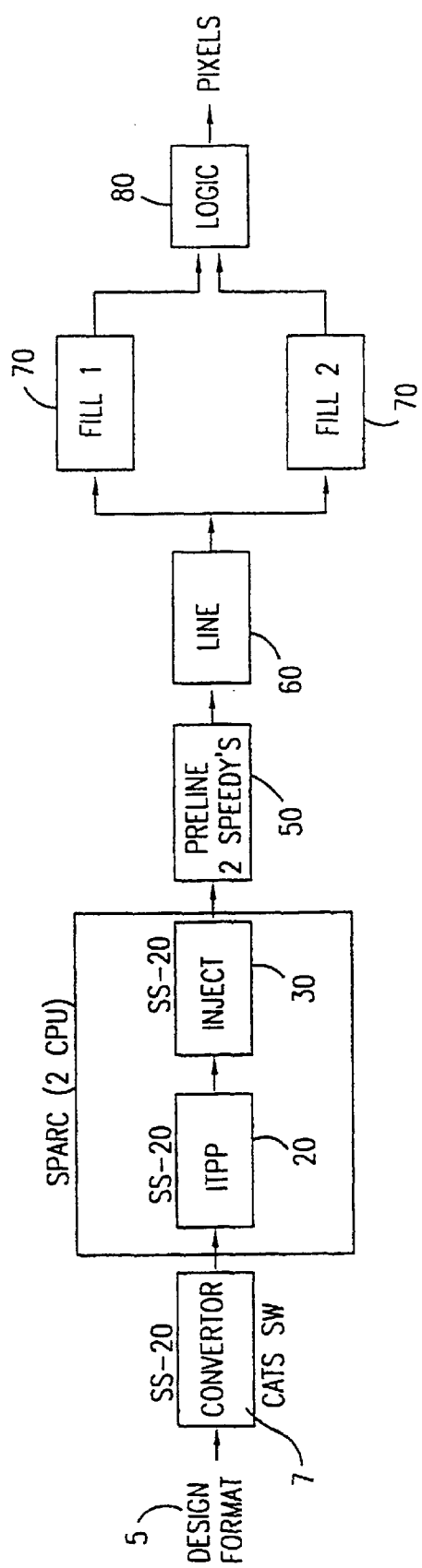
FIG. 15 illustrates a preferred implementation of data converter apparatus in accordance with the present invention.

FIG. 15 illustrates an example of a particular application in which the spanner includes two parallel processors 52 in the pre-line machine 50.

Figure 16:
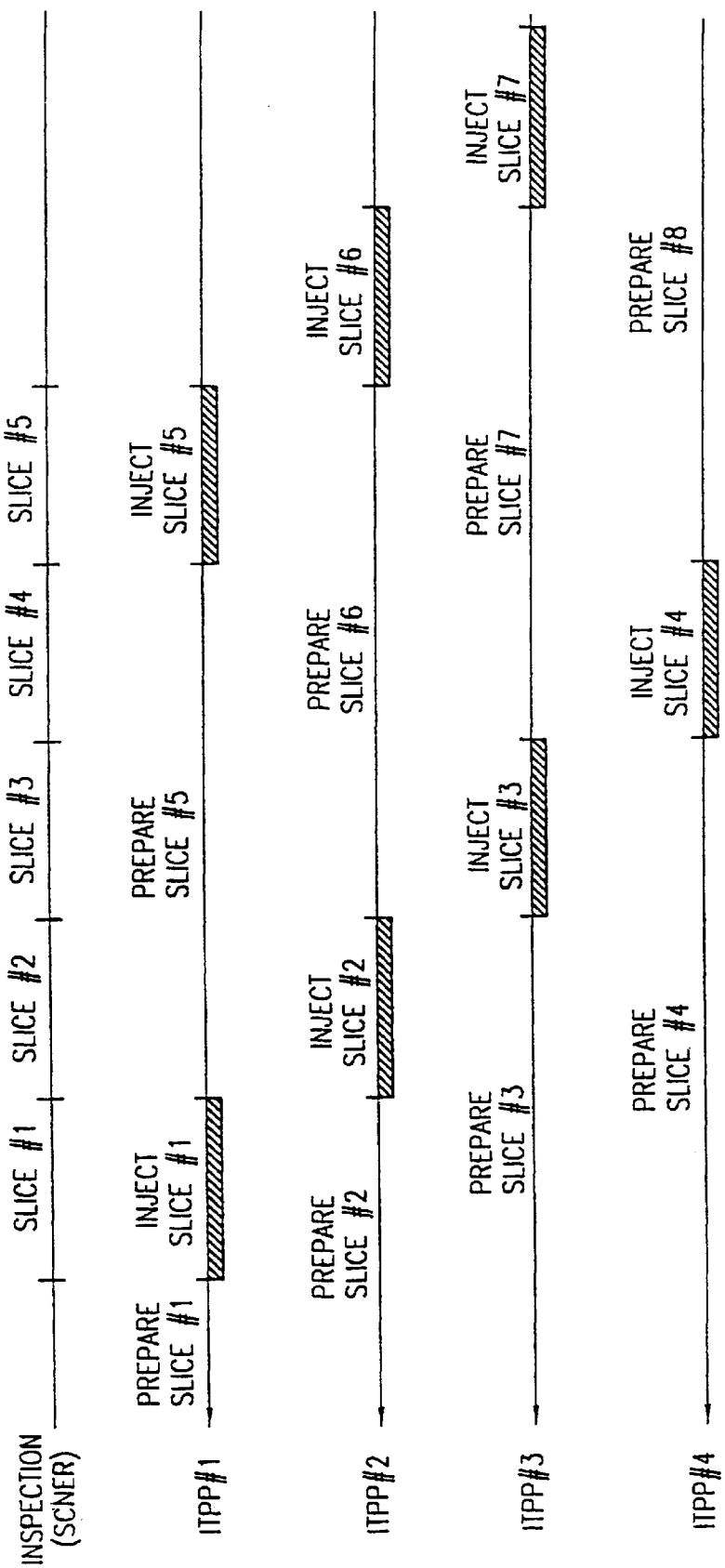
FIG. 16 illustrates an example of a time sequence for performing the various operations in the data converter apparatus of FIG. 15.

FIG. 16 illustrates the operation of a system including four ITPPs, $ITTP_1$–$ITTP_4$. After $ITPP_1$ has prepared the data of slice $S_1$, it injects the data of slice $S_1$ at the time $ITPP_2$ prepares the data of slice $S_2$; $ITPP_2$ injects the data of slice $S_2$ at the time $ITPP_3$ prepares the data of slice $S_3$; and $ITPP_3$ injects the data of slice $S_3$, at the time $ITPP_4$ prepares the data of slice $S_4$. By following this approach, more "preparation" time is allocated for the ITTP module.

The invention is particularly useful in the database-to-object inspection systems described in U.S. Pat. Nos. 5,619,428 and 5,586,058, assigned to the same assignee as the present invention, which patent applications are hereby incorporated by reference.

While the invention has been described with respect to a preferred embodiment thereof, it will be appreciated that this is set forth merely for purposes of example, and that many other variations, modifications and applications of the invention may be made.

In the claims that follow characters used to designate claim steps are provided for convenience of description only and do not necessarily imply particular order of performing the steps. Likewise, the order in which functions of respective converter modules are recited in the claims below, should not be construed as binding.

What is claimed is:

1. Data converter apparatus for converting in essentially real time pattern data stored in an input compact format representing a design database into a pixel output expanded real time format, the pattern data including a plurality of pattern groups and different instances of the same pattern group, each pattern group including a plurality of basic geometric figures; the data converter comprising:

a processor adapted to receiving the pattern data stored in the compact format, selecting a pre-defined division of the received data, which division includes a plurality of said groups, dividing each group into at least one bin of basic geometric figures, determining the number of instances that each bin is present in a respective division and describing an instance of a bin only once in a database store, and for said respective division determining a set of locations wherein the locations correspond to each instance of each bin, and outputting a list of different bins and the location of the bins in the respective division from said set of locations;

a partial expander adapted to receiving, expanding and sorting said list of bins in each respective division, according to scan order; and a final expander adapted to sub-dividing, according to scan order, each division into a plurality of sub-divisions, processing and allocating each basic geometric figure in a respective bin into a sub-division according to the location of the respective basic geometric figure in the bin and the location of the bin in the sub-division, generating a sub-division data stream representative of the plurality of basic geometric figures in a respective sub-division by outputting a pixel output expanded real time format image for said plurality of basic geometric figures, and combining said sub-division data streams into one data stream in said pixel output expanded real time format, which data stream is representative of the plurality of basic geometric figures in the respective division.

2. The apparatus according to claim 1, wherein said partial expander and said final expander expand the pattern data of the respective division during the time said processor processes the pattern data relating to the next predetermined division.

3. The apparatus according to claim 1, wherein the final expander processes and allocates concurrently basic geometric figures in the respective bin into said sub divisions.

4. The apparatus according to claim 1, wherein said divisions of the stored pattern data in the compact format represent slices of a frame of an object, and wherein said sub-divisions represent equally-divided windows of the respective slice.

5. The apparatus according to claim 1, wherein the pattern groups of each frame represent respective patterns.

6. The apparatus according to claim 1, wherein said final expander includes a Pre-line system comprising:

a plurality of parallel processors for expanding the pattern data of each bin into respective window related data; and, a plurality of registers, one for each of said processors, recording the respective window related data.

7. The apparatus according to claim 6, wherein said Pre-line system further comprises:

a collator receiving the data outputted from said registers and merging it into a stream of data; and an output FIFO register outputting said stream of data.

8. The apparatus according to claim 7, wherein said collator further having a synchronization mechanism for synchronizing the operation of said processors to start essentially simultaneously operation thereof in each new window.

9. The apparatus according to claim 6, wherein said final expander further includes a line system comprising:

a line machine receiving from said FIFO register the respective window related data and outputting lists of coordinate pairs defining lines for the respective windows; and a carry-over FIFO register receiving from said input FIFO register the data relating to the next window, and further receiving remainder data relating to the next window to minimize Y coordinate clipping.

10. The apparatus according to claim 9, wherein said final expander further includes a Fill system which receives the list of coordinate pairs from the Line machine, and a Fill logic system which outputs a pixel map of said data in the pixel expanded real-time format.

11. The apparatus according to claim 1, wherein said basic geometric figure is a trapezoid.

12. The apparatus according to claim 1, wherein the height of each bin is less than the height of a window and the basic geometric figures in each bin are processed and allocated to one out of two possible windows in said final expander.

13. The apparatus according to claim 1, wherein X coordinate clipping is applied to each one of the processed basic geometric figures in a sub division which is outside the boundaries of said division in the X direction, by conforming the boundaries of said sub-division to said division boundary.

14. A database-to-object inspection system, including:

an optical inspection system optically for inspecting a surface of an object and outputting a series of pixels corresponding to the inspected surface;

a database containing design data of the inspected object, which design data is stored in an input compact format;

a data converter apparatus according to claim 1, adapted to convert in essentially real time the design data stored in the input compact format into a pixel output expanded real time format;

a comparator for comparing in real time the series of pixels outputted by the optical inspection system with a series of pixels in said real time pixel expanded format outputted by said data converter apparatus.

15. Data converter apparatus for converting in essentially real time pattern data stored in an input compact format representing a design database into a pixel output expanded real time format, the pattern data including a plurality of pattern groups and different instances of the same pattern group, each pattern group including a plurality of basic geometric figures; the data converter comprising:

a processor having a selector for selecting a predetermined division of pattern data received from said design database, wherein said selector divides and processes said received pattern data into consecutive bins of basic geometric figures according to scan order, determines the number of instances that each bin is present in said predetermined division, describes an instance of a bin only once in a database store, and determines a set of locations wherein the locations correspond to each instance of each bin;

said selector sub-divides the respective division into sub-divisions having structural correspondence to the pixel output expanded real time format; and said selector processes and allocates the basic geometric figures in the bins to subdivisions according to the location of said basic geometric figures in each bin and the location of each bin in each subdivision to produce a division data stream representative of the basic geometric figures in said subdivisions by outputting a pixel output expanded real time format image for said basic geometric figures in said subdivision and the locations of the bins in each subdivision.

16. A method for converting in essentially real time pattern data stored in an input compact form representing a design database into a pixel output expanded real time format, the pattern data including a plurality of pattern groups and different instances of the same pattern group, each pattern group including a plurality of basic geometric figures; the method comprising the following steps:

(a) receiving the pattern data stored in the compact format, (b) selecting a pre-defined division of the received data, which division includes a plurality of said pattern groups, (c) dividing each pattern group into at least one bin of basic geometric figures, (d) determining the number of instances that each bin is present in a respective division, describing an instance of a bin only once in a database store, and, for said respective division, determining a set of locations wherein the locations correspond to each instance of each bin, (e) outputting a list of different bins and the location of the bins in the respective division from said set of locations;

(f) partially expanding said list of bins in each respective division, according to scan order;

(g) sub-dividing, according to scan order, each division into a plurality of sub-divisions, (h) processing and allocating each basic geometric figure in a respective bin into a sub-division according to the location of the respective basic geometric figure in the bin and the location of the bin in the sub-division, (i) generating a sub-division data stream representative of the plurality of basic geometric figures in a respective sub-division by outputting a pixel output expanded real time format image for said plurality of basic geometric figures; and (j) combining said sub-division data streams into one data stream in said pixel output expanded real time format, which data stream is representative of the plurality of basic geometric figures in the respective division.

17. The method according to claim 16, wherein while said operations (f)–(j) are performed on the received data of the respective division, operations (a)–(e) are performed on received data relating to the next predetermined division.

18. The method according to claim 16, wherein basic geometric figures in the respective bin are processed and allocated concurrently into said sub divisions in said step (h).

19. The method according to claim 16, wherein said divisions of the stored data in the compact format represent slices of a frame of an object, and wherein said sub-divisions represent equally-divided windows of the respective slice.

20. The method according to claim 16, wherein the pattern groups of each frame represent respective patterns.

21. The method according to claim 16, wherein said operation includes the following steps performed in a Pre-line system:

expanding, in a plurality of parallel processors, the pattern data of each bin into respective window related data; and recording to a plurality of input FIFO registers, one for each of said processors, the respective window related data.

22. The method according to claim 21, wherein said operation (j) further includes the following steps performed in a Pre-line system:

collating the data outputted from said input FIFO registers and merging it into a stream of data and outputting said stream of data.

23. The method according to claim 22, wherein said operation (j) further includes the following steps performed in a Pre-line system:

synchronizing said processors to essentially simultaneously start their respective operation in each new window.

24. The method according to claim 21, wherein said operation (j) further includes the following steps performed in a Line system:

converting the respective window related data from said input FIFO registers to lists of coordinate pairs defining lines for each respective window; and storing in carry-over FIFO registers the respective window related data from said input FIFO registers relating to the next window, and further receiving remainder data relating to the next window to minimize Y coordinate clipping.

25. The method according to claim 24, wherein said operation (j) further includes the following steps performed in a Fill system:

receiving, in a Fill system, the list of coordinate pairs from the Line system, and outputting in a Fill logic system a pixel map of said data in the pixel expanded real-time format.

26. The method according to claim 16, wherein said basic geometric figure is a trapezoid.

27. The method according to claim 16, wherein the height of each bin is less than the height of a window and the basic geometric figures in each bin are allocated to one out of two possible windows in step (h).

28. The method according to claim 16, further comprising the step of:

applying X coordinate clipping is to each one of the processed basic geometric figures in a sub division which is outside the boundaries of said division in the X direction, by conforming the boundaries of said sub-division to said division boundary.

29. A method for optically inspecting a surface of an object, comprising:

storing in a database design data of the object in an input compact format;

converting the database design data stored in said input compact format into a stream of pixels in a pixel output expanded real time format, according to the method of claim 16;

optically inspecting said surface and producing a stream of pixels corresponding to the inspected surface; and comparing in real time the stream of pixels corresponding to the inspected surface with the stream of pixels in said pixel output real time expanded format.

30. A method for converting in essentially real time pattern data stored in an input compact format representing a design database into a pixel output expanded real time format, the pattern data including a plurality of pattern groups and different instances of the same pattern group, each pattern group including a plurality of basic geometric figures; the method comprising the following steps:

(a) selecting a predetermined division of received pattern data from said design database, (b) dividing and processing said received pattern data into consecutive bins of basic geometric figures according to scan order, determining the number of instances that each bin is present in said predetermined division, describing an instance of a bin only once in a database store, and determining a set of locations wherein the locations correspond to each instance of each bin;

(c) sub dividing the respective division into subdivisions having structural correspondence to the pixel output expanded real time format;

(d) processing and allocating the basic geometric figures in the bins to subdivisions according to the location of said basic geometric figures in each bin and the location of the bin in each subdivision to produce a division data stream representative of the basic geometric figures in said subdivision by outputting a pixel output expanded real time format image for said basic geometric figures and said locations of said bins.

* * * * *